United States Patent
Zimmerman

[11] 3,896,562
[45] July 29, 1975

[54] GRAIN CONDITIONING APPARATUS

[75] Inventor: Walter H. Zimmerman, Litchfield,
[73] Assignee: Zimmerman Equipment Co. Inc., Litchfield, Ill.
[22] Filed: Feb. 16, 1972
[21] Appl. No.: 226,797

[52] U.S. Cl.................................... 34/174; 34/34
[51] Int. Cl............................................ F26b 17/12
[58] Field of Search ............ 34/168, 174, 169, 131, 34/34; 165/108

[56] References Cited
UNITED STATES PATENTS
1,595,928  8/1926  Rhoads.................................. 34/34
3,474,903  10/1969  Ausherman...................... 34/174 X

*Primary Examiner*—William E. Wayner
*Attorney, Agent, or Firm*—John L. Wiegreff

[57] ABSTRACT

Grain drying and conditioning apparatus, especially adapted to dry shelled corn and other similar grain or particulate material in a continuous cycle of operation. The apparatus comprises two concentric annular pervious walls of different diameters spaced to confine the grain or material in the form of an annular column, or shell, of such material of thickness equal to the spacing of the walls which forms a plenum chamber enclosing a blower and heater assembly located in a cylindrical duct mounted on the inner wall. The air intake to the blower and heater assembly is through the lower portion of the walls and the incoming air cools that portion of the hollow column of grain that has been heated and dried by the heated air which is forced through the upper portion of the hollow material column and the confining perforated walls by the positive pressure developed by the blower. A special baffle between the blower and heater assembly duct and the inner wall separate the positive pressure zone of the plenum chamber into which the blower exhausts from the lower pressure zone adjacent the intake of the blower where the pressure is slightly below atmospheric pressure, hereafter referred to as negative pressure for convenience. The baffle extends across the space between the blower and burner duct and the inner pervious wall and has openings, the minimum sizes of which are such as to prevent the accumulation of combustible material at any place in the positive pressure zone on the exhaust side of the blower and the total area of which is such as not to substantially reduce the pressure differential flow of heating and drying gases through the pervious walls of the positive pressure plenum zone.

6 Claims, 6 Drawing Figures

GRAIN CONDITIONING APPARATUS

BACKGROUND OF THE INVENTION

1. Field of the Invention

The invention relates to the construction of apparatus for drying grain or small particulate material, which includes foreign matter or small particulate matter, both heavy and light, which collects on surfaces in the positive pressure zone and any combustible matter therein and creates a fire hazard because of possible burning debris passing through the heater in the drying gasses from the blower. With the advent of the state and national programs for preserving the ecological environment the restrictions against discharging the combustible material into the atmosphere has placed a severe restriction on the design and use of drying apparatus of the type to which this invention relates.

Although at the time of this invention firm requirements have not been set, indications are that such requirements may be such as to prohibit the emission of any particulate matter from such drying apparatus other than that which will pass through a fine screen in the neighborhood of 50 mesh.

The size of the openings in the outer pervious wall of the present construction is such as to permit only the emission of the heated gases to the outside atmosphere.

The present invention which substantially eliminates the fire hazard also provides a construction which lends itself to meeting the ecological standards for the preservation of the ecological environment.

2. Description of the Prior Art

As far as is known there is no grain conditioning apparatus available on the commercial market that can meet such requirements and avoid the inherent fire hazard, inherent in such apparatus. The present invention has such capabilities because it does not permit any particulate foreign material or any particulate material being treated to escape with the heating and drying gases into the atmosphere or immediate environment.

There are numerous variations of designs of grain drying apparatus and a complete analysis of the different types here would be more confusing than enlightening.

However, there are at least three prior United States patents, namely, U.S. Pat. Nos. to Molenaar 2,654,590, dated Oct. 6, 1953, Ausherman et al. 3,333,348, dated Aug. 1, 1967 and Ausherman 3,474,903, dated Oct. 28, 1969, which are believed to be representative of the patented prior art nearest to the type of construction of the present invention. These patents recognize the fire hazards inherent in such apparatus but do not solve the problem in such a manner as to meet the developing ecological environment standards. Molenaar U.S. Pat. No. 2,654,590 suggests recirculation of that portion of the exhausted air which is the hottest and has the lowest humidity to produce "a stirring action of the grain, and which shall be self cleaning, and which shall have a minimum of fire hazard." It should be noted that this patent shows a construction wherein free falling grain, with its dust and chaff, falls downwardly against the upwardly flowing heating and drying gases. These gases will obviously carry with them at least some of the particulate matter into the local outside environment and atmosphere.

The other two patents mentioned above show a general arrangement and configuration similar to that used to illustrate the present invention but completely depart from the present invention in that the patent has a solid floor, or "imperforate partition" separating the upper positive pressure plenum zone from the lower negative pressure plenum zone adjacent the intake to the blower fan. It is to be noted, however, that in U.S. Pat. No. 3,333,348 there is no provision for disposal of the combustible particulate matter which is inherently always present in material such as shelled corn and the like. There is no special provision for permitting this combustible material to escape into the atmosphere with the heating and drying gases. Obviously, by making the perforations in the outer wall large enough some of the lighter material would escape and reduce, to some extent, the amount that might collect on the solid partition. Since the heating and drying gases are emitted from the upper end of the blower and burner duct there is no fast flow of gases to remove the combustible material that will collect on the upper surface of that horizontal partition and a definite fire hazard would exist as has been observed and is well understood in this drier art.

The Ausherman U.S. Pat. No. 3,474,903 recognizes the fire hazard and appears to be considered as an improvement over U.S. Pat. No. 3,333,348.

The primary difference between the two patents is the pair of conduits 72 and 74 extending transversely of the dryer and through the side walls to convey combustible debris therefrom. The patent states that the heated combustion gases act to discharge the inflammable debris and the like from the plenum chamber without affecting the overall efficiency thereof.

Without discussing the possible improvement over the previously mentioned patent as far as the fire hazard is concerned this latter patent clearly does not meet the primary objective of the present invention. In column 2 of that patent it is explained that the construction is such that although "minute particles may be pulled into the duct and tests into the plenum chamber, a pair opposed conduit members extend transversely of the spaced pervious walls so that the hot air gases and increased pressure in the upper plenum chamber forces the debris found upon the solid partition wall outwardly through the spaced conduits externally of the entire apparatus thereby proving a safety feature so that the debris does not ignite due to the heater element therein".

This is the point at which the present invention differs from the prior art. In accordance with the present invention it has been found that transverse conduits, such as those shown in U.S. Pat. No. 3,474,903 cannot keep all of the area of the partition free from the fire hazard. This has been learned from extensive tests and experiments. Furthermore, this latter patented construction has no potential for meeting ecological restrictions upon the emission of solid matter into the atmosphere.

SUMMARY OF THE INVENTION

The present invention is based on the concept of providing grain drying and conditioning apparatus having spaced air pervious walls between which a column of grain, or the like, to be treated progresses downwardly past a blower and heater assembly wherein the grain is first subjected to heated air flowing in one direction to heat and dry the grain and is then subjected to cool air flowing in the opposite direction to cool the grain.

The exhaust side of the blower is arranged to force heated air through a first zone of the column in a first direction while the intake side of the blower draws outside air in a second and opposite direction in a second zone of the column. The heating zone is behind the cooling zone with respect to the direction of movement of the grain column and a by-pass passage is provided from the higher pressure heating zone to the lower pressure cooling zone to permit the passage of combustible material, which is not entrapped in the column of grain, from the exhaust side to the intake side of the blower and thus into the heater, preferably an open flame burner, where the combustible material is consumed in the burner.

Since the column of grain provides devious paths around the randomly positioned grain for the heating and drying gases in and around the kernels of the grain, the combustible material that is pulled into the intake of the blower along the cooling zone and consumed in the flame and the debris which is not carried by the heating gases into the grain column will be by-passed through the by-pass passage and will be recirculated through the burner and will be eventually consumed so that such solid matter is reduced to fine ash.

Since the primary purpose of grain conditioners is to enhance the quality of the grain the development of grain dryers has reached a stage where they are provided with automatic controls to maintain simultaneously in proper balance, several factors, such as uniform rate of drying, maximum uniform temperature, elimination of excessive localized heating and subsequent cooling rate so as not to adversely affect the quality of the grain. However, heretofore, characteristic of technological developments generally, grain dryers have not been designed to provide operating conditions which will not adversely effect ecological environment.

When heated air is passed over or through grain, within limits, the moisture will be removed at a rate depending upon the temperature of the air and its rate of flow past the individual kernels.

There is a definite limit as to how fast moisture can be made to move within the grain kernel called the diffusion rate. Corn, for example, should not be heated above 140° F. if its quality is not to be adversely affected. Furthermore, non of the individual grain kernals should be dried below 13.5 percent moisture content if cracking is to be prevented. If the temperature of the air becomes higher than that necessary to effect the desirable maximum diffusion rate, some of the heat energy is wasted in the exhaust air, resulting in excessive fuel costs in addition to damaging the grain. Also, if the temperature is too high, the outer surface of the kernels will dry too fast, resulting in what is called case hardening and this adversely affects further removal of moisture from inside the kernels. Also, if the volume of airflow over the grain exceeds that which is necessary to effect the maximum drying rate, there will be a waste of power in moving the air.

It is well understood that in order to properly condition grain for storage it is necessary to cool the grain immediately after the drying operation in order to prevent the grain from reabsorbing moisture from the outside air.

The construction of the present invention retains the advantages of the prior technological developments and incorporates in the construction of grain dryers a feature which does not despoil the ecological environment and at the same time eliminates the inherent fire hazard.

While the preferred embodiment comprising two concentric pervious circular cylindrical walls spaced to confine a hollow column of the grain being treated, is chosen for illustrating the invention, it should be understood that various other substantially similar constructions, could be used incorporating the invention concept as defined herein.

DESCRIPTION OF THE PREFERRED EMBODIMENT

Figure 1:
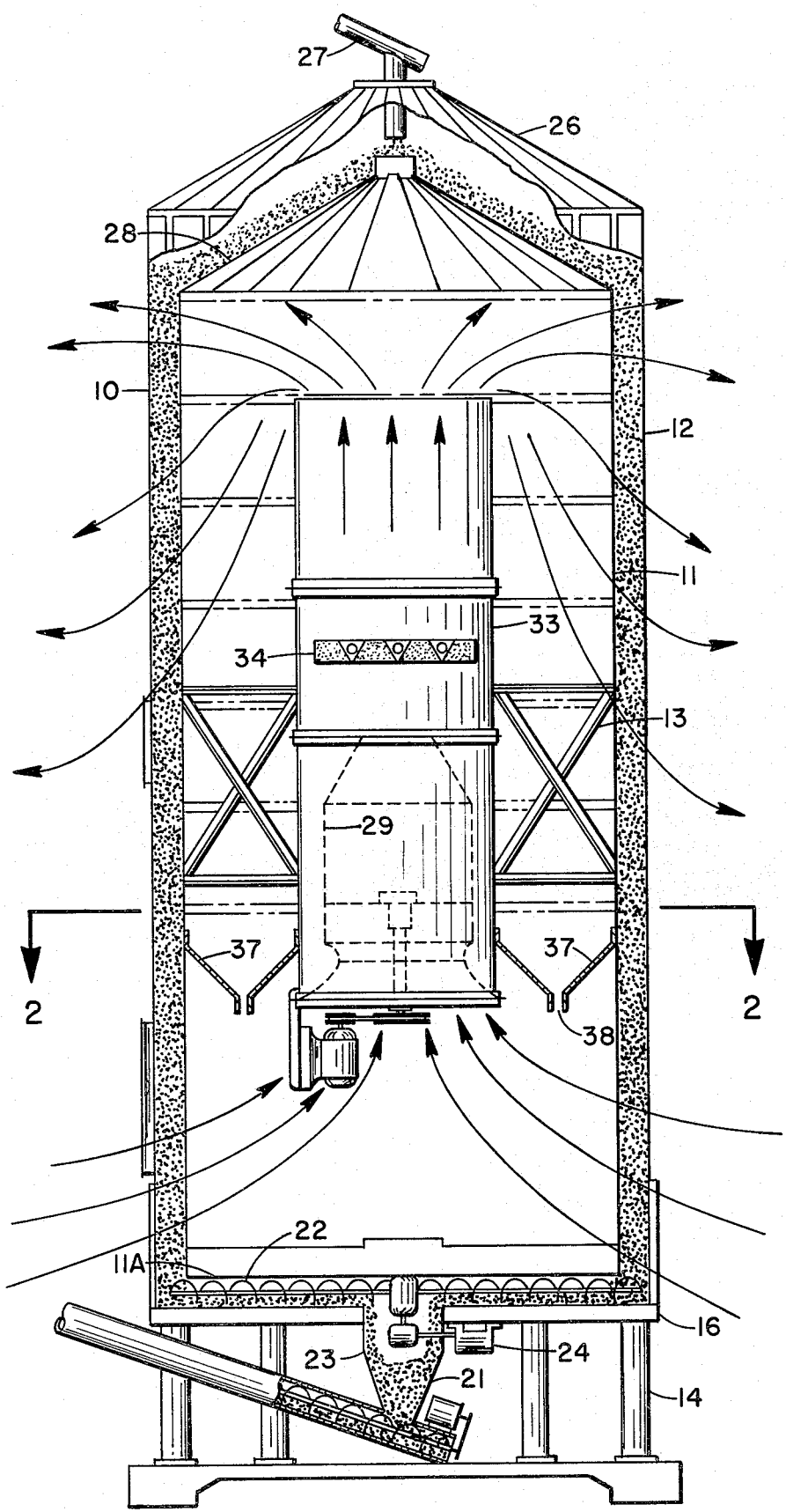
FIG. 1 is a vertical cross sectional view of grain conditioning apparatus illustrating the present invention.

The embodiment of the invention chosen for the purpose of illustration comprises a frameless tower 10 which constitutes the structural configuration of the grain conditioning apparatus of the present invention.

The tower 10 comprises two pervious concentric cylindrical thin metal walls 11 and 12 of different diameters so that they are spaced to confine a hollow column of grain or similar particulate material, to be treated.

The outside wall 12 is supported by an annular channel iron ring 16 supported by posts 14 and the inner pervious cylindrical wall 11 is rigidly supported by the outer wall 12 in spaced relation thereto by pervious metal web members 17 which are suitably secured to the inner and outer walls 11 and 12. The web members 17 are suitably secured to the annular channel ring 16 and effectively constitute longitudinal ribs of the tower 10. The metal webs 17 are pervious to facilitate the flow of air through the column of grain.

Both the inner and outer walls 11 and 12 are fabricated in conventional manner of rectangular perforated metal sheet sections which are held in assembled relation by bolts or rivets.

As clearly shown in FIG. 1 the bottom end 11 of the inner wall 11 terminates above the bottom end of the outer wall 12 to accommodate suitable metering means 21 which are provided for bringing the grain from the bottom of the grain column. The metering means 21 is in the form of a plurality of radial augers 22 which are rotated about their respective axes while they are simultaneously revolved about the central axis of the tower 10. The rotation and revolution of the augers 22 is effected through a suitable power transmission train and mechanism, enclosed in a housing 23 and driven by a variable speed motor 24. As will be apparent from the subsequent description the grain metering means 21 performs the important function of removing the grain from the bottom of the grain column at a controlled rate to permit the grain column to move downwardly under the action of gravity. As each conveyor auger passes any given point and draws the grain from the bottom of that portion of the column of grain toward the center, that portion of the column moves downward to fill the void left by the grain removed by the auger. This action follows each auger as they revolve about the central axis of the tower. The rate of withdrawal of the grain from the bottom of the column is one of the factors to be adjusted to vary the drying rate and the final moisture content of the treated grain.

The upper end of the tower 10 is provided with a conical shaped roof 26 supported by web member ribs and the outer wall 12.

At the apex of the roof a suitable grain conduit 27 is provided for supplying to the dryer grain to be treated. A suitable conical garner 28 distributes the incoming grain uniformly around the periphery of the dryer tower as the grain is usually fed in continuously.

A blower and heater assembly 29 is mounted on the longitudinal ribs of the tower by means of suitable braces 13. This assembly comprises a central duct 33, supported by the braces 13. An open flame gas burner is arranged symmetrically about the axis of the duct 33 and a suitable blower generates a stream of air flowing past the burner 34 which is exhausted into the upper portion of chamber defined by the grain walls. It will be apparent that with the blower and burner discharging heating and drying gases into the upper portion of the chamber a plenum zone of positive pressure will develop as a result of the flow resistance of the grain. Likewise, adjacent the intake end of the blower a zone of lower or negative pressure will be developed. To further separate the chamber surrounded by the hollow column of grain into the positive and negative pressures special baffle means 37 is provided across the space between the central duct 33 and the inner pervious wall 11.

The baffle means 37, in the preferred embodiment has an annular slot 38, or by-pass passage which permits any solid material carried by the heated gases from the exhaust side of the blower 29 which is not forced into the hollow column of grain around the positive pressure zone to pass from the positive pressure zone to the negative pressure zone where it may be drawn into the intake of the blower and into the flame of the burner 34 where it may be consumed. On the other hand, the combustible material may not be completely consumed in the first pass through the burner and may complete another or more passes through the burner 34 until it is consumed to fine ash.

The upper portion of the hollow grain column from the baffle 37 to the top of the chamber is the positive pressure zone from which heated gases are forced through the grain column to heat the grain and carry the moisture outside of the dryer. The hollow column of grain constitutes a filter screen and will entrap some of the light and combustible material. As that portion of the column of grain with the entrapped material gradually progresses downward in response to the operation of the augers 22 of the grain metering means and passes below the baffle 37 the column of grain will be subjected to the influence of the intake side of the blower and will be cooled by the air flowing in the opposite direction into the negative pressure zone from outside the tower 10. Any light and comustible material in the grain column surrounding this zone will be directed through the burner and will be either recirculated from the positive to the negative pressure zone through the by pass passage in the baffle or go into the grain column surrounding the positive pressure zone, move down with the grain to the lower negative pressure zone where the incoming cooling air will carry it into the intake of the blower to complete the recirculation cycle.

Figure 2:
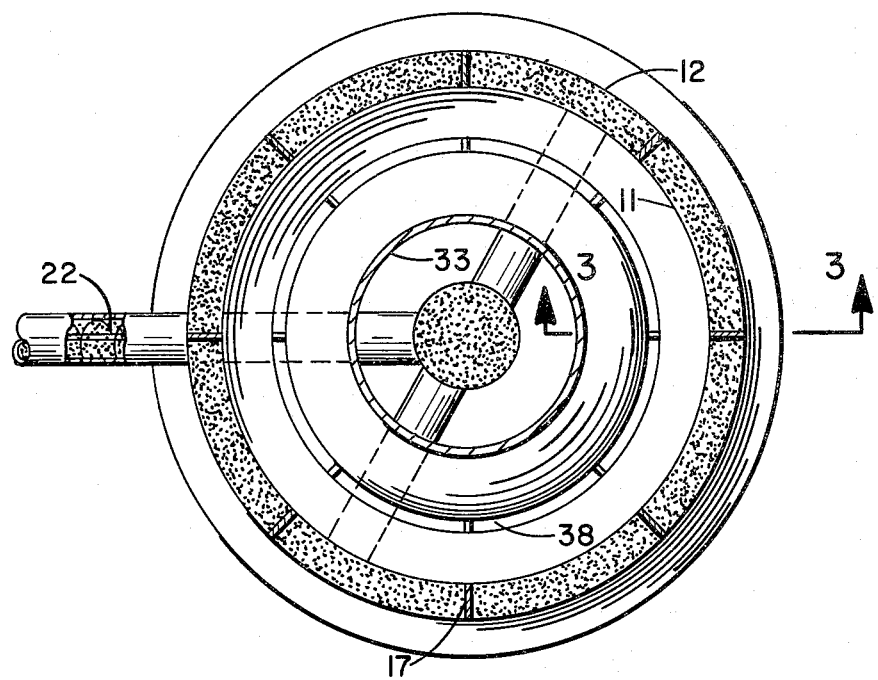
FIG. 2 is a sectional plan view of FIG. 1 on line A—A.

It is not desirable to have any more air than is necessary pass through the by-pass passage (slot 38 in FIGS. 1 and 2) in the baffle 37 between the positive and negative pressure zones since the heated air that goes through the by-pass directly reduces by that amount the heated air available for drying the grain in that part of the grain column surrounding the positive pressure zone.

On the other hand, the minimum dimension of any portion of the by-pass passage must be such that it will prevent any combustible debris from accumulating at points where the opening is too small to permit the passage of the largest particle. This minimum size of passage can be determined by experimentation of these dryers under different operating conditions.

Figure 3:
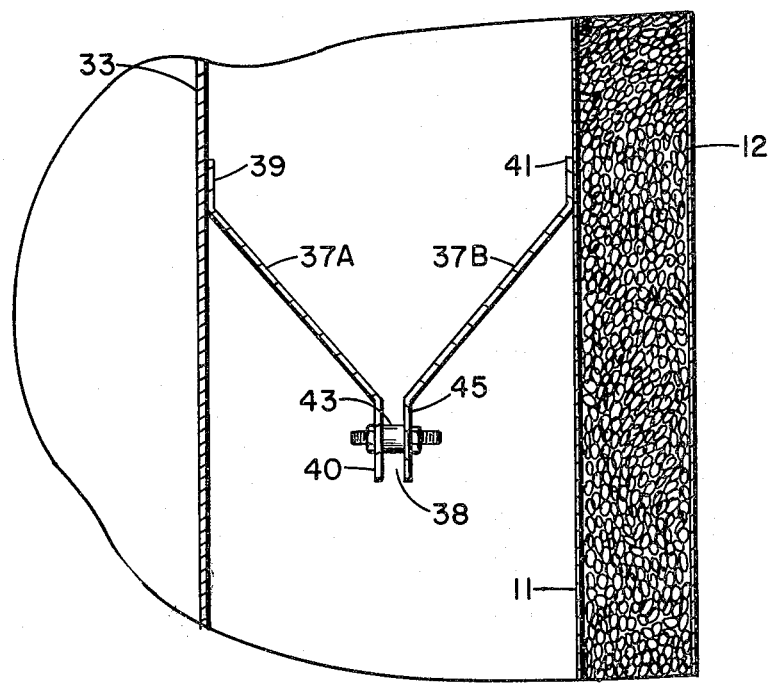
FIG. 3 is an enlarged partial sectional profile view of FIG. 2.

Also all of the surfaces of the baffle 37 must be so sloped that no debris and combustible material will accumulate thereon. In the preferred embodiment of FIGS. 1 through 4, inclusive, the baffle means 37 comprises two annular conical sections 37 a and 37 b in anti-nested relation. The outer edges of the sections have flanges 39 and 41 which are suitably secured to the central duct 33 and inner pervious wall 11, respectively, while flanges 40 and 45 on the apices of the sections 37a and 37b, respectively, are held in spaced relation to provide the by-pass annular slot 38. FIG. 3 illustrates the flanges being held apart by spacer 43 on bolts or screws engaging the flanges.

Figure 4:
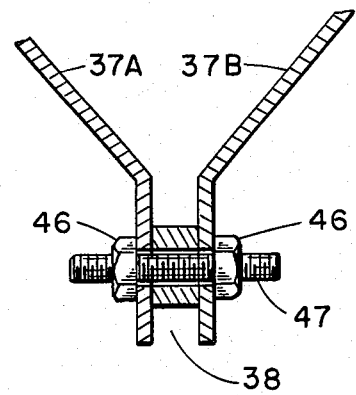
FIG. 4 is an enlarged partial sectional view similar to that of FIG. 3 illustrating means for adjusting the spacing between the apices of conical sections of the baffle to thereby vary the width of the annular slot.

FIG. 4 illustrates one means for adjusting the width of the slot 38 in the form of threaded right and left hand nuts 44 and 46 fixed to the apex flanges of the conical sections which threadedly engage a headless stud 47 having right and left hand threads. The width of the slot may be varied by turning the stud 47.

Figure 5:
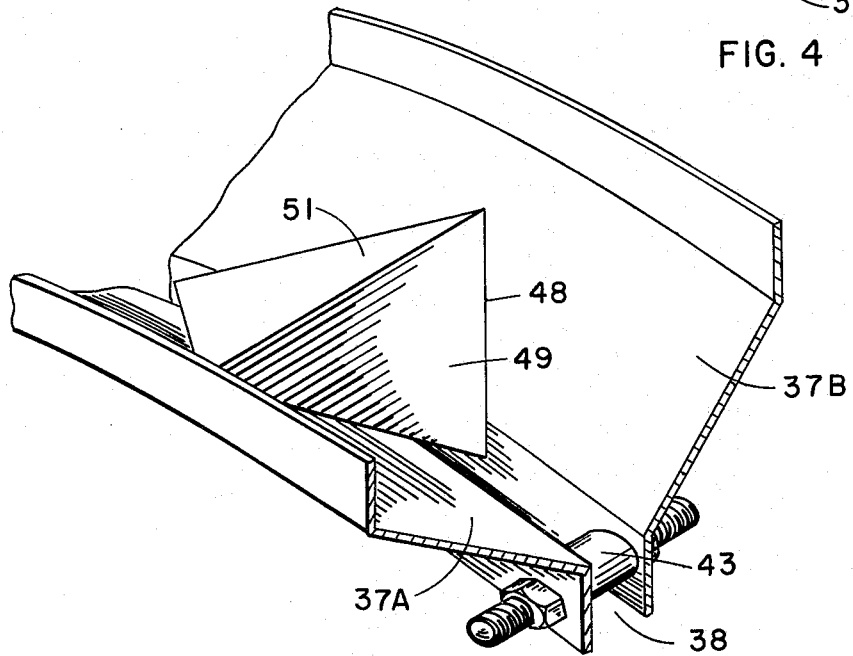
FIG. 5 is a partial isometric view illustrating a modified form of the means for varying the effective size of the annular by pass slot.

In FIG. 5 there is illustrated another form of means for adjusting the total area of the by-pass passage without reducing the minimum dimension of any portion of the by-pass below the critical value. In this modified form V-shaped elements 48 have triangular faces 49, 51, the edges of which will conform to the slope of the conical sections 37a and 37b to provide a substantially airtight fit with the sections. The spacing and the number of the elements 48 can be selected to produce the desired operating condition. The slope of the faces 49 and 51 should be substantially the same as that of the conical sections 37a and 37b to avoid accumulation of any light combustible material where it might be ignited by a burning particle discharged from the exhaust side of the blower after passing through the flame of the burner 34.

Figure 6:
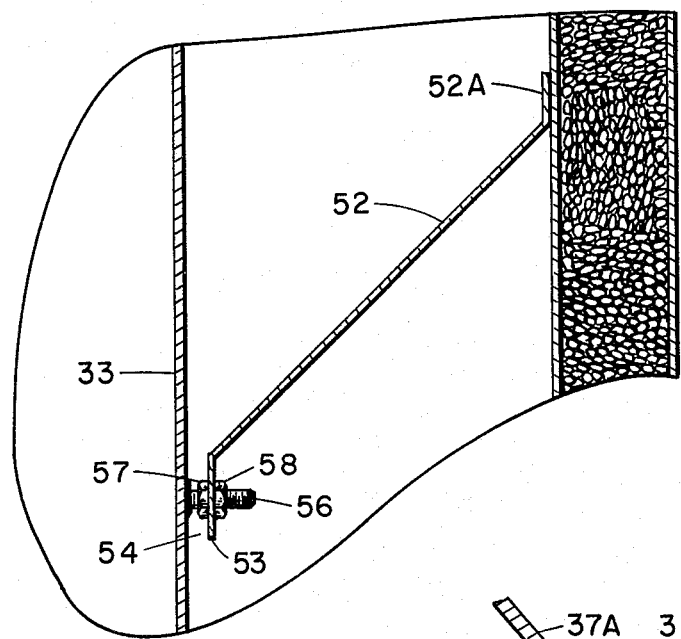
FIG. 6 is a sectional profile view of a modified form of the baffle means illustrated in FIGS. 1, 3 and 4.

A modified form of the baffle means between the positive and negative pressure zones is illustrated in FIG. 6. In this embodiment a single conical section 52 has a flange 52a which is suitably secured to the inner wall 11. The other edge of the section 52 has a flange 53 adjacent to but spaced from the central duct 33. The width of the annular slot 54 between the wall of the duct 33 and the flange 53 may be adjusted by means similar to that illustrated in FIG. 4. Specifically a threaded stud 56 secured to the outer side of the blower and heater duct 33 extends through a hole in the flange 53 and its adjusted position can be varied by adjusting the nuts 57, 58. Obviously as many of these means are provided around the periphery of the flange 53 as are necessary to provide uniform adjustment of the slot 54.

The slope of the surface of the conical section 52 should be substantially the same as that as explained with respect to conical sections 37a and 37b. It has been learned from experience that the slope of the surfaces of the baffle should be in the neighborhood of 45 degrees or more with respect to the horizontal in order to reduce probability of fire hazard. A greater slope may be desirable in some instances. The actual slope necessary is dependent upon the type and smoothness of the surfaces and the type of debris and combustible material in the grain.

In a practical construction of the present invention which has been constructed the perforations in the portion of the outer wall 12 above the baffle means 37 were 0.050 inches in diameter while the perforations in the inner wall in the same zone were 0.078 inches in diameter. The sizes of the perforations of the inner and outer walls below the baffle 37 are 0.078 inches in diameter for the outer wall and 0.050 inches in diameter for the inner wall.

The bottom of the tower 10 is closed by a solid plate under the augers 22 in order to maintain the desired negative pressure below the baffle 37. In order to adjust this negative pressure openings are provided through both side walls 11 and 12 and ducts are sealed therein to by-pass some of the outside air into the negative pressure zone. One of such by-pass ducts is represented by the arrows on the left hand side of the tower 10.

I claim as my invention:

1. Grain drying and conditioning apparatus comprising:
  a. a pair of spaced air pervious walls for confining a column of grain to be heated and dried,
  b. blower and heater means for causing heated air to be forced through a first zone of said column of grain in one direction to heat and extract moisture therefrom and simultaneously causing air for cooling said grain to be forced through a second zone of said grain column in a direction opposite to the flow of said heated air,
  c. means providing a by-pass passage between the discharge side and the intake side of said blower and heater means,
  d. said pervious walls being in the form of concentric circular cylinders of different diameters and spaced to confine a hollow column of grain,
  e. said blower and heater means being in the form of an assembly including a duct having an impervious wall and being mounted within said inner pervious wall for heating and impelling air from said first zone to said second zone,
  f. baffle means between the duct of said blower and heater assembly and said inner pervious wall having a by-pass passage to permit particulate matter discharged from the exhaust side of said blower to pass directly into the inlet side of said duct while permitting restricted air flow therethrough,
  g. said baffle means being in the form of a pair of conical sections in anti-nested relation with the outer edge of one of said sections being in engagement with said duct of said blower and heater assembly and the other of said sections having its outer edge in engagement with the inside of said inner pervious wall, the apices of said sections being adjacent each other but spaced to provide an annular by-pass passage for particulate matter and combustible debris between the exhaust side and the intake side of said blower and burner assembly.

2. Grain drying and conditioning apparatus comprising:
  a. a pair of spaced air pervious walls for confining a column of grain to be heated and dried in the form of a first hollow tubular pervious sheet structure forming an outer pervious wall and a second similar inner hollow tubular pervious sheet structure forming an inner pervious wall,
  b. a blower and heater assembly within said second tubular structure and including a duct having an impervious wall for causing air to be forced through one zone of said column of grain on the exhaust side of said blower to heat and extract moisture from the grain and for simultaneously causing air for cooling said grain to be forced through another zone of said grain column on the intake side of said blower in a direction opposite to the flow of said heated air,
  c. baffle means extending between the wall of said duct of said blower and heater assembly and the pervious wall of said second tubular structure to enhance the flow of air in opposite directions through said zones,
  d. said baffle means having one edge thereof in engagement with one of said walls and having its surface sloping downwardly toward the other of said walls and having adjacent its other edge passageways arranged around said blower and heater assembly between the latter and said inner pervious wall to provide by-pass passageway for particulate matter and combustible debris between the exhaust side and the intake side of said blower and burner assembly.

3. The combination as set forth in claim 2, in which:

said baffle means is in the form of a single annular section with one edge of said section in engagement with the inside of said inner pervious wall and the other edge thereof adjacent to but spaced from said duct of said blower and burner assembly to provide a passage for particulate matter and combustible debris between the exhaust side and the intake side of said blower and heater assembly while providing a restricted air by-pass therebetween.

4. The combination as set forth in claim 2, and means for adjusting the total area of said by-pass passage.

5. The combination as set forth in claim 2 and means for supplying grain to be treated at one end of the column and removing grain from the other end of said column at a controlled rate.

6. The combination as set forth in claim 2 in which said heater is an open flame burner.

* * * * *